United States Patent
Kelchner et al.

(10) Patent No.: US 9,804,250 B2
(45) Date of Patent: Oct. 31, 2017

(54) SYSTEMS, METHODS, AND APPARATUS FOR OPTICAL BORE SIGHT ERROR MEASUREMENT AND CORRECTION

(71) Applicant: The Boeing Company, Chicago, IL (US)

(72) Inventors: Bryan L. Kelchner, Albuquerque, NM (US); Matthew D. Nixon, Albuquerque, NM (US); Stephanie S. Blount, Albuquerque, NM (US)

(73) Assignee: The Boeing Company, Chicago, IL (US)

( * ) Notice: Subject to any disclaimer, the term of this patent is extended or adjusted under 35 U.S.C. 154(b) by 249 days.

(21) Appl. No.: 14/833,895

(22) Filed: Aug. 24, 2015

(65) Prior Publication Data
US 2017/0059686 A1  Mar. 2, 2017

(51) Int. Cl.
*G01S 3/78* (2006.01)
*G01S 3/786* (2006.01)

(52) U.S. Cl.
CPC ............ *G01S 3/7803* (2013.01); *G01S 3/786* (2013.01)

(58) Field of Classification Search
CPC . G01P 3/36; G01B 11/26; G01S 17/66; G01S 3/7803
See application file for complete search history.

(56) References Cited

U.S. PATENT DOCUMENTS

2010/0282942 A1\* 11/2010 Mosier ................. F41H 13/005
250/203.2

\* cited by examiner

*Primary Examiner* — Tony Ko
(74) *Attorney, Agent, or Firm* — Kwan & Olynick LLP

(57) ABSTRACT

Systems, methods, and apparatus are disclosed for determining bore sight error. An apparatus may include an optical lens and a collimated light source configured to emit a beam of collimated light having a first wavelength, where the beam of collimated light passes through the optical lens and parallel to an optical axis of the optical lens. The apparatus may further include a position sensitive detector configured to receive the beam emitted by the collimated light source, and identify a first position of the beam relative to the position sensitive detector. The apparatus may also include a processing device configured to generate a bore sight error metric based, at least in part, on the first position identified by the position sensitive detector. The bore sight error metric characterizes a difference between an actual position of a target object and a perceived position viewed by the optical lens.

20 Claims, 6 Drawing Sheets

SYSTEMS, METHODS, AND APPARATUS FOR OPTICAL BORE SIGHT ERROR MEASUREMENT AND CORRECTION

TECHNICAL FIELD

This disclosure generally relates to optical lenses and, more specifically, to bore sight error measurement and correction associated with such optical lenses.

BACKGROUND

Optical systems and tools may include optical lenses to image and track target objects. Such optical systems may be included in spacecraft, aircraft, ground vehicles, and maritime vessels. The optical systems may include zoom lenses which may be focused at various different focus lengths. Such zoom lenses may have associated bore sight errors that may vary from focal length to focal length. A bore sight error is an error or difference between an actual position of an object in physical space as compared to the position of an object when viewed through the lens. Such bore sight errors may result from a variety of different sources, such as changes in temperature, changes in humidity, as well as manufacturing defects and imperfections. Accordingly, changes in parameters associated with optical lenses, such as changes in focal length, may generate bore sight errors that result in inaccurate representations of a target object's actual position.

SUMMARY

Systems, method, and apparatus for manufacturing, using, and otherwise implementing optical bore sight measurement and correction are disclosed herein. In various embodiments, the apparatus may include an optical lens configured to focus an image at a focal plane using one of a plurality of focal lengths. The apparatus may also include a collimated light source configured to emit a beam of collimated light having a first wavelength, where the beam of collimated light passes through the optical lens and parallel to an optical axis of the optical lens. The apparatus may further include a position sensitive detector configured to receive the beam emitted by the collimated light source, where the position sensitive detector is further configured to identify a first position of the beam relative to the position sensitive detector. The apparatus may also include a processing device communicatively coupled to the position sensitive detector, where the processing device is configured to generate a bore sight error metric based, at least in part, on the first position identified by the position sensitive detector. In some embodiments, the bore sight error metric characterizes a difference between an actual position of a target object and a perceived position viewed by the optical lens.

In various embodiments, the apparatus may further include a first reflective member configured to receive the beam from the collimated light source, where the first reflective member is further configured to reflect the beam through the optical lens. The apparatus may also include a second reflective member configured to receive the beam of light from the first reflective member after the beam has passed through the optical lens, where the second reflective member is further configured to reflect the beam to the position sensitive detector. In some embodiments, the first reflective member and the second reflective member are configured to be transmissive in a first range of wavelengths, and the first reflective member and the second reflective member are further configured to be reflective in a second range of wavelengths. Moreover, the first wavelength of the beam may be included in the second range of wavelengths. In some embodiments, the apparatus further includes an imaging sensor configured to detect at least a portion of the first range of wavelengths.

In some embodiments, the position sensitive detector is a same optical distance from the optical lens as the imaging sensor, and the beam of collimated light is passed through a center of the optical lens. In various embodiments, the position sensitive detector is further configured to determine a second position, where the second position is different than the first position, and where a difference between the first position and the second position results from a bore sight error associated with the optical lens. In some embodiments, the bore sight error metric is calculated based on the difference between the first position and the second position. In various embodiments, the bore sight error results from a change in the optical lens from a first focal length to a second focal length. According to some embodiments, the processing device is further configured to update time-space-position-information (TSPI) data associated with a target object based on the bore sight error metric. In various embodiments, the processing device is configured to update the TSPI data by adjusting spatial data underlying the TSPI data based on a difference characterized by the bore sight error metric.

Also disclosed herein are systems that may include an optical lens configured to focus an image at a focal plane using any one of a plurality of focal lengths and an imaging sensor configured to generate an image based on light received from the optical lens. The systems may further include a collimated light source configured to emit a beam of collimated light having a first wavelength, where the beam of collimated light passes through the optical lens and parallel to an optical axis of the optical lens. The systems may also include a position sensitive detector configured to receive the beam and identify a first position of the beam relative to the position sensitive detector. The systems may further include a first reflective member configured to receive the beam from the collimated light source and reflect the beam through the optical lens. The systems may also include a second reflective member configured to receive the beam of light from the first reflective member and reflect the beam to the position sensitive detector. The systems may further include a processing device communicatively coupled to the position sensitive detector, where the processing device is configured to generate a bore sight error metric based, at least in part, on the first position identified by the position sensitive detector. In some embodiments, the bore sight error metric characterizes a difference between an actual position of a target object and a perceived position viewed by the optical lens.

In some embodiments, the position sensitive detector is further configured to determine a second position, where the second position is different than the first position, and where a difference between the first position and the second position results from a bore sight error associated with the optical lens. In various embodiments, the first position and second position are each mapped to an XY coordinate representation of the position sensitive detector. In some embodiments, the bore sight error metric is calculated based on the difference between a first XY coordinate pair characterizing the first position and a second XY coordinate pair characterizing the second position. In various embodiments, the processing device is further configured to update time-space-position-information (TSPI) data associated with a target object based on the bore sight error metric. According to some embodiments, the processing device is configured to update the TSPI data by adjusting spatial data underlying the TSPI data based on a difference characterized by the bore sight error metric.

Also disclosed herein are methods that may include transmitting, from a collimated light source, a collimated beam of light through an optical lens and to a position sensitive detector, and determining, using the position sensitive detector, a first position and a second position associated with the collimated beam of light, the first position and the second position being determined relative to a sensing surface of the position sensitive detector. The methods may also include determining a bore sight error metric based, at least in part, on a relationship between the determined first position and the second position of the collimated beam of light. In various embodiments, the transmitting may further include reflecting, using a first reflective member, the beam from the collimated light source to the optical lens, and reflecting, using a second reflective member, the beam of light from the first reflective member to the position sensitive detector after the beam has passed through the optical lens. In various embodiments, the methods may also include updating time-space-position-information (TSPI) data associated with a target object based on the bore sight error metric. According to various embodiments, the updating of the TSPI data further includes adjusting spatial data underlying the TSPI data based on a difference characterized by the bore sight error metric.

While numerous embodiments have been described to provide an understanding of the presented concepts, the previously described embodiments may be practiced without some or all of these specific details. In other instances, well known process operations have not been described in detail so as to not unnecessarily obscure the described concepts. While some concepts have been described in conjunction with the specific examples, it will be understood that these examples are not intended to be limiting, and other suitable examples are contemplated within the embodiments disclosed herein.

DETAILED DESCRIPTION

Figure 1:
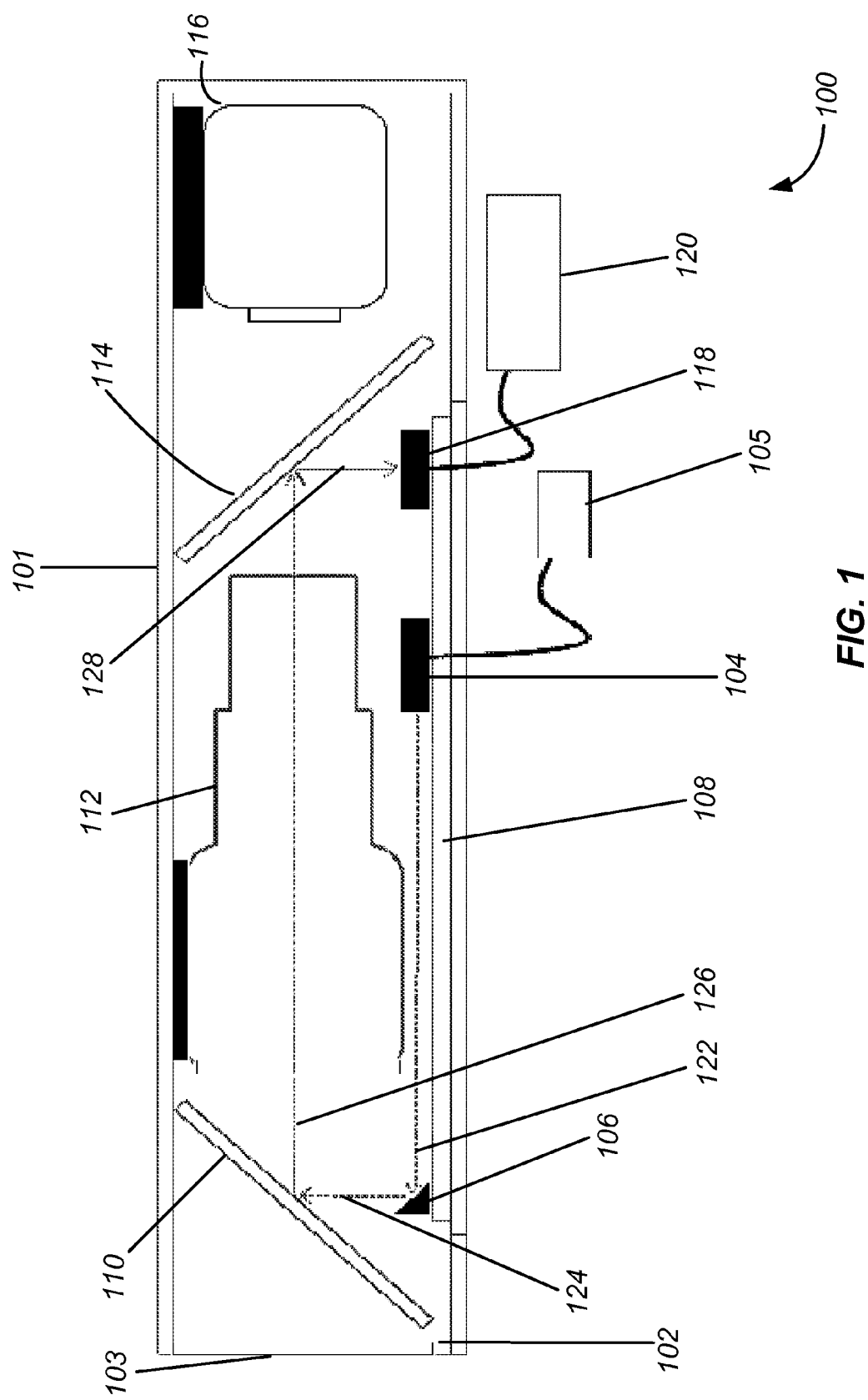
FIG. 1 illustrates a diagram of an example of an optical tool, implemented in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

As discussed above, changes in parameters associated with optical lenses, such as changes in focal length, may generate bore sight errors that result in inaccurate representations of a target object's actual position. For example, to accurately determine time-space-position-information (TSPI) for a target object, all of the errors in an optical system must be determined in real time, where one of those errors is the optical bore sight error at all zoom/focus positions for continuous or discrete zoom lenses. Bore sight errors of optical zoom lenses may be determined by a vendor as part of the calibration through the run out of the zoom lens. The bore sight error is determined with each zoom/focus position and mapped to a corresponding zoom encoder position. This data is provided as a table of values which can be loaded into software to compute TSPI data. However, the bore sight error of the lens changes during operation due to environmental conditions (temperature and humidity), gravity sag, platform dynamics (such as vibration and shocks), and operational degradations. All of these errors result in increasing TSPI error. Many of these errors cannot be calibrated out of the system because the errors are constantly changing. Furthermore, when multiple optical systems are on the same mount or movable platform and separated by some distance, parallax may exist between the multiple optical systems such that bore sight errors multiply errors in the TSPI data.

Various embodiments disclosed herein may determine bore sight error in real time for one or more optical lens systems thus allowing for bore site error correction when generating TSPI data. Various embodiments disclosed herein may include a coherent or collimated light source that may project a beam into an optical lens and be used to measure bore sight error with a position sensitive detector. In some embodiments, the position sensitive detector may be positioned at the same optical distance from the last lens element of the optical lens to the focal plane of an imaging sensor associated with the optical lens. In various embodiments, reflective members may also be included that are configured to match the spectral bandpass of the imaging sensor, and are further configured to be highly reflective at the wavelength of the collimated light source. The reflective members may modify a trajectory of the collimated beam of light to accurately pass the beam through the optical lens. As will be discussed in greater detail below, differences in measured positions of the beam may be used to determine, in real time, bore sight errors of the lens, and may be further used to correct or compensate for such errors.

Accordingly, such real time bore sight error measurement and correction may also enable the real time correction of parallax within a focal plane by centering the real-time bore sight to the focal plane, and allowing the target object to remain in the field of view. Because various embodiments disclosed herein provide the real time measurement of bore sight errors, all contributing factors to the bore sight error, such as thermal and mechanical errors, may be compensated for. Because all such errors may be compensated for in real time, various embodiments disclosed herein may be implemented using standard commercial off-the-shelf zoom lenses with bore sight errors as high as 1 milliradian, as well as the more expensive, higher quality zoom lenses with a bore sight errors of 40 microradian.

FIG. 1 illustrates a diagram of an example of an optical tool, implemented in accordance with some embodiments. An optical tool, such as optical tool 100, may be configured to include one or more components configured to monitor and track a target object. In various embodiments, optical tool 100 includes an optical lens that, as discussed above, may experience bore sight error when, for example, changing between focal lengths. Accordingly, a perceived position of the target object may shift and change as a result of the bore sight error, thus resulting in an erroneous tracked position of the target object. In various embodiments, optical tool 100 may be configured to measure and correct the bore sight error associated with the optical lens, thus providing an accurate representation of the position of the target object.

In various embodiments, optical tool 100 may include housing 101 which may be configured to house and provide structural support for one or more components of optical tool 100. For example, housing 101 may include an internal cavity or chamber that may be substantially hollow, and has one or more attachment points configured to be mechanically coupled to one or more components of optical tool 100 discussed in greater detail below. Housing 101 may be made of a rigid material such as a metal or polymer. In some embodiments, housing 101 may include an aperture or opening such as aperture 102, which may be configured to provide an opening through which a subject or target may be viewed. Accordingly, a first end of housing 101 that includes aperture 102 may be directed to or pointed at a subject or target that is to be viewed by optical tool 100. In some embodiments, aperture 102 may include a lens that seals the internal chamber of housing 101. For example, aperture 102 may include lens 103 which may be configured to transmit light received and processed by other components of optical tool 100.

In various embodiments, optical tool 100 may further include collimated light source 104 which may be configured to emit or transmit a collimated beam of light. Collimated light source 104 may be a laser configured to emit a beam of collimated light having a particular wavelength and a particular spot size. For example, collimated light source 104 may be a diode laser configured to emit light having a wavelength of between about 830 nanometers and 860 nanometers. While various examples of wavelength ranges are disclosed herein, any suitable wavelength compatible with the lens coatings and sensors disclosed herein may be implemented. Moreover, the beam emitted by collimated light source 104 may have a spot size of about 10 nanometers in diameter. As will be discussed in greater detail below, a wavelength of light emitted by collimated light source 104 may be configured based on one or more properties of various reflective surfaces of optical tool 100 as well as an intended operational wavelength range of imaging sensor 116. In various embodiments, collimated light source 104 may be coupled to a power supply, such as power supply 105, which may be configured to provide power to collimated light source 104 thus enabling collimated light source 104 to emit a beam of collimated light.

Optical tool 100 may also include beam reflector 106 which may be coupled another component, such as structural support member 108, which may be a rigid plane or shaft. In various embodiments, beam reflector 106 may include a reflective surface, such as a mirror, which may be configured to deflect the beam emitted by collimated light source 104. Thus, beam reflector 106 may impart a designated angle to the trajectory of the beam emitted by collimated light source 104. In some embodiments, the angle may be about 90 degrees relative to the initial trajectory or path of the beam. In this way, as will be discussed in greater detail below, beam reflector 106 may be configured to angle the beam to one or more reflective members which may be configured to pass the beam through an optical lens, and enable the measurement of a bore sight error of the optical lens.

Accordingly, optical tool 100 may include first reflective member 110 which may be configured to reflect a beam emitted from collimated light source 104. In some embodiments, first reflective member 110 may reflect the beam into an optical lens, such as optical lens 112. Accordingly, the beam may be emitted from collimated light source 104, angled by beam reflector 106, and reflected into optical lens 112 by first reflective member 110. In various embodiments, first reflective member 110 may be configured to be configured to reflect some wavelengths while transmitting others. Accordingly, first reflective member 110 is transparent to a first range of wavelengths while being reflective to a second range of wavelengths. In some embodiments, the first range of wavelengths includes the operational range of a camera sensor, such as imaging sensor 116 discussed in greater detail below. Accordingly, light having wavelengths in the first range may be received at aperture 102, may pass through first reflective member 110 and into optical lens 112. In various embodiments, a wavelength of collimated light source 104 is included in the second range of wavelengths. Therefore, instead of transmitting the beam emitted by collimated light source 104, first reflective member may be configured to reflect the beam. In this way, first reflective member 110 is transparent with respect to imaging sensor 116 and reflective with respect to collimated light source 104.

In some embodiments, a surface of first reflective member 110 is coated with a dichroic coating configured to transmit the first range of wavelengths and further configured to reflect the second range of wavelengths. Moreover, according to some embodiments, first reflective member 110 is configured to be oriented at an angle relative to beam reflector 106 and optical lens 112 that reflects the beam along or parallel to an optical axis of optical lens 112. Furthermore, the beam may be reflected through the center of optical lens 112. In this way, the beam of collimated light may be reflected through a central optical axis of optical lens 112.

As discussed above, optical tool 100 may further include optical lens 112 which may include one or more lenses configured to focus light received from aperture 102 at a focal plane which may be imaged by imaging sensor 116. In various embodiments, optical lens 112 is a continuous zoom lens that includes an assembly of several different lens elements. Accordingly, positions of the lens elements may be adjusted to modify a focal length of optical lens 112. Furthermore, optical lens 112 may be a commercially available off-the-shelf lens which may has sight errors as high as 1 milliradian. As discussed above, the movement and manufacture of the lens elements included in optical lens 112 might result in errors or differences in a perceived position of a target object. For example, a slight variance in an orientation of a lens element that may occur when moving the lens element may be caused by imperfections in the mechanical rails along which the lens element is moved. Such variances in orientation may cause a shift or change in a perceived position of one or more objects viewed by optical lens 112 and a corresponding bore sight error. Other causes of such bore sight error may include environmental conditions such as temperature, humidity, and mechanical defects and errors. Accordingly, when optical lens 112 is focused at a first focal length, a target may be perceived by optical tool 100 at a first spatial position which may be encoded as first time-space-positioning-information (TSPI) data. If optical lens 112 is subsequently focused to a second focal length, which may occur when zooming in on the target, the target may be perceived by optical tool 100 at a second spatial position which may be encoded as second TSPI data.

Optical tool 100 may further include second reflective member 114 which may be configured to reflect a beam emitted from collimated light source 104 that has passed through optical lens 112. As similarly discussed above with reference to first reflective member 110, in some embodiments, second reflective member 114 is configured to be transparent to a first range of wavelengths while being reflective to a second range of wavelengths. The first range of wavelengths may include light captured and imaged by imaging sensor 116, while the second range of wavelengths may include the wavelength of beam of light emitted by collimated light source 104. In some embodiments, a surface of second reflective member 114 is coated with a dichroic coating configured to transmit the first range of wavelengths and further configured to reflect the second range of wavelengths. Moreover, according to some embodiments, second reflective member 114 is configured to be oriented at an angle relative to optical lens 112 and position sensitive detector 118 that reflects the beam from optical lens 112 to position sensitive detector 118 at an orientation that is substantially orthogonal to a sensing surface of position sensitive detector 118. In various embodiments, second reflective member 114 is not shown in FIG. 1 to scale, and is smaller than first reflective member 110. For example, second reflective member 114 may be configured to have a height slightly larger than a height of a sensor included in imaging sensor 116.

As discussed above, optical tool 100 may include imaging sensor 116 which may be a sensor configured to capture an image projected by optical lens 112. In various embodiments, imaging sensor 116 is a digital camera sensor configured to detect signals that constitute an image received by optical tool 100. Accordingly, imaging sensor 116 may be a semiconductor based imaging device. For example, imaging sensor 116 may include a charge-coupled device (CCD) or a complementary metal-oxide-semiconductor (CMOS) based sensor. In various embodiments, imaging sensor 116 is configured to detect a particular range of wavelengths to generate an image. The range of wavelengths may be determined based on one or more design specifications that configured optical tool 100 to capture images in that particular range of wavelengths. For example, optical tool 100 may be designed to capture images in a visible range of light, which may be between about 400 nm to 700 nm. When configured in this way, imaging sensor 116 may be configured to detect signals in the visible range of light, and capture images based on the detected signals. As discussed above with respect to first reflective member 110 and second reflective member 114, the range of wavelengths detected by imaging sensor 116 may be included in the first range of wavelengths. While examples disclosed herein may utilize an optical tool configured to capture visible light, other configurations that capture other wavelength ranges may also be implemented, such as other short-wave and mid-wave ranges.

Optical tool 100 may include position sensitive detector 118 which may be configured to detect or determine a position of a beam emitted by collimated light source 104. In some embodiments, position sensitive detector includes a sensing surface that includes photosensitive elements configured to detect light emitted from collimated light source 104. The photosensitive elements may be arranged and mapped to various locations on the sensing surface such that activation of a particular photosensitive element may correspond to a particular location on an X-Y spatial grid represented by the sensing surface. In various embodiments, position sensitive detector 118 is configured to sample and monitor an output of the photosensitive elements on the sensing surface and record an output signal of the sensing surface. In this way, position sensitive detector 118 may periodically measure and record a detected position of the beam emitted by collimated light source 104. As position sensitive detector 118 continues to monitor the position of the beam, any changes in the position may be recorded and provided as an output signal to processing device 120 discussed in greater detail below. For example, the beam may be reflected to position sensitive detector 118 and may be contact the sensing surface of position sensitive detector 118 at a first position corresponding to a first X-Y coordinate pair. The position may change in response to an event, such as the changing of a focal length of optical lens 112. Accordingly, after the event, the beam may contact the sensing surface at a second location corresponding to a second X-Y coordinate pair that is different than the first X-Y coordinate pair.

In various embodiments, position sensitive detector 118 may be positioned at a same optical distance from a rear surface or element of optical lens 112 as imaging sensor 116. Accordingly, a first distance traveled by light from optical lens 112 to imaging sensor 116 may be the same as a second distance traveled from optical lens 112 to position sensitive detector 118. When configured in this way, a bore sight error perceived by imaging sensor 116 and position sensitive detector may be the same, thus ensuring accurate measurement and compensation for bore sight error by optical tool 100.

In some embodiments, position sensitive detector 118 may be coupled to a processing device, such as processing device 120, which may be configured to process the output signal generated by position sensitive detector 118 to measure and correct for a bore sight error associated with optical lens 112. As similarly discussed above, a change in a position of the beam of collimated light relative to the sensing surface of position sensitive detector 118 may be due to a bore sight error of optical lens 112. Accordingly, processing device 120 may be configured to calculate a bore sight error metric that characterizes or represents the bore sight error of optical lens 112. In some embodiments, processing device 120 is configured to calculate or determine the bore sight error metric by calculating a difference value associated with the position of the beam of collimated light relative to the sensing surface of position sensitive detector 118. For example, if the beam moves from a first position to a second position in response to optical lens 112 being changed from a first focal length to a second focal length, processing device 120 may be configured to calculate and record a difference between the first position and the second position. If the first position corresponds to a first X-Y coordinate pair and the second position corresponds to a second X-Y coordinate pair, the difference value may be an X-Y difference value calculated by subtracting the second X-Y coordinates from the first X-Y coordinates. In various embodiments, processing device 120 may be included in optical tool 100 as an on-board processing device, or alternatively may be implemented as an external processing device which may be included in an external data processing system.

In various embodiments, processing device 120 is further configured to correct or compensate for the bore sight error. Thus, in addition to measuring the bore sight error, processing device 120 may be further configured to perform one or more operations to eliminate the bore sight error. For example, as discussed above, optical tool 100 may be configured to determine and record a position of a target object as time-space-positioning-information (TSPI). Accordingly, a location of the target object may be determined and encoded in three-dimensional space based on a known focal length and focus position of optical lens 112 as well as a known orientation of optical lens 112 which may be determined based on a position of a platform on which optical tool 100 is mounted. In various embodiments, processing device 120 is configured to adjust or modify the recorded TSPI characterizing the position of the target object based on the determined difference value. For example, if optical lens 112 has been moved from a first focal length to a second focal length, and a corresponding bore sight error has resulted, a difference value may be computed as discussed above. The difference value may be applied to TSPI data calculated for the position of the target object at the second focal length. In one example, the TSPI data may be adjusted based on a difference along an X axis and a difference along a Y axis represented in the difference value. In this way, the TSPI data may be modified and updated to compensate for bore sight error that may result from changing between focal lengths of optical lens 112. In various embodiments, instead of modifying the TSPI data, the difference value may be output as a difference signal which may be provided to a tracking system. In this way, the calculated difference relative to a calibrated "zero" may be output as an offset signal that is provided to the tracking system, and enables the tracking system to compensate for the offset.

FIG. 1 further illustrates a path traveled by a beam of collimated light that may be emitted from collimated light source 104. In various embodiments, the beam initially travels along first path 122 to beam reflector 106. Beam reflector 106 is configured to modify a trajectory of the beam and direct the beam along second path 124 to first reflective member 110. As discussed above, first reflective member 110 is configured to reflect the beam into optical lens 112 and along third path 126. The beam passes though optical lens 112 and contacts second reflective member 114. As stated above, second reflective member 114 is configured to reflect the beam to position sensitive detector 118 along fourth path 128. Accordingly, changes to a focal length of optical lens 112 may modify a trajectory of the beam along third path 126, and may change a position or orientation of the beam's contact with second reflective member 114 and position sensitive detector 118 due to bore sight error. The change in position may be measured, recorded, and used to correct for the bore sight error when determining a location of a target object viewed by optical tool 100.

Figure 2:
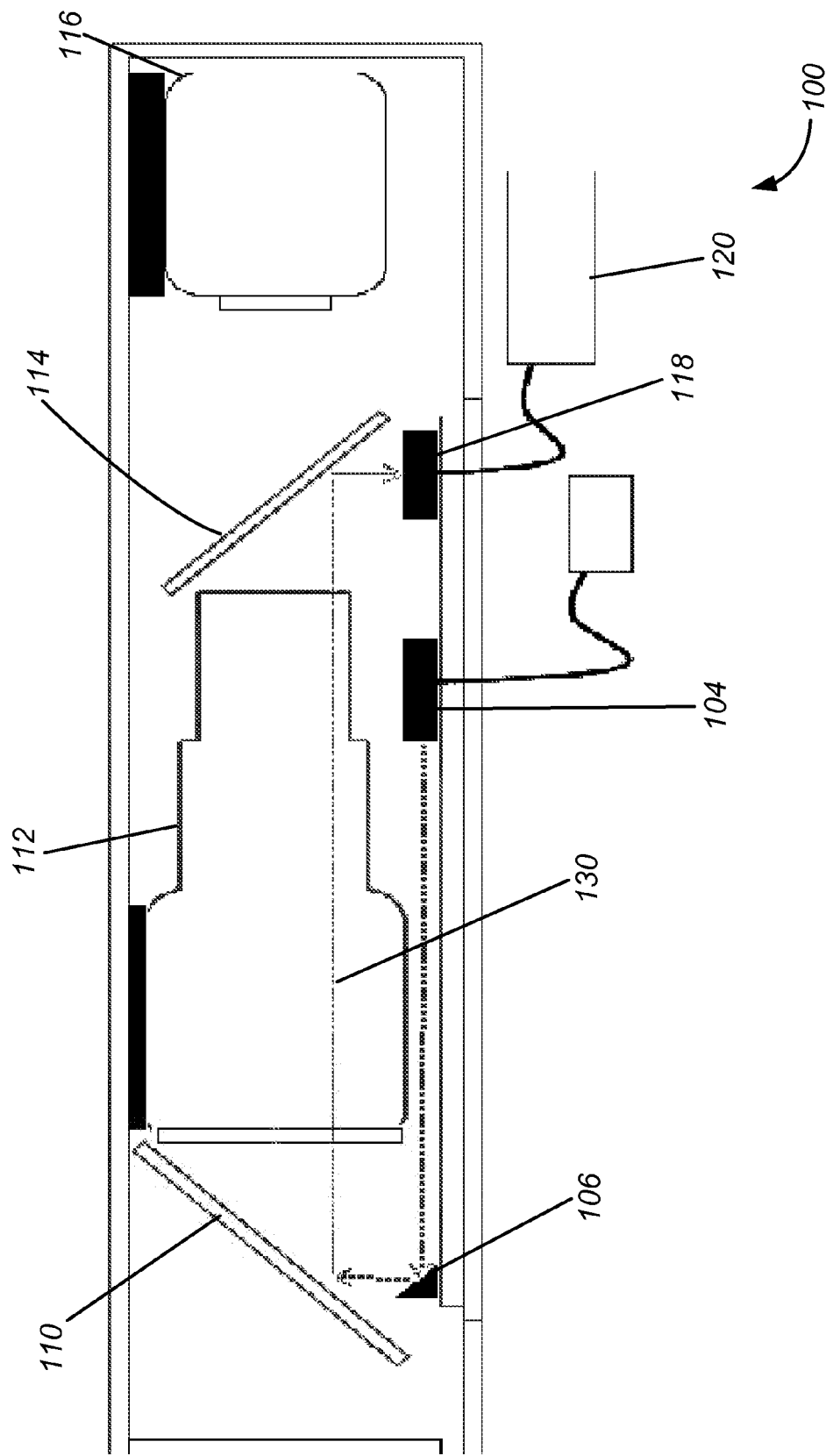
FIG. 2 illustrates a diagram of another example of an optical tool, implemented in accordance with some embodiments.

FIG. 2 illustrates a diagram of another example of an optical tool, implemented in accordance with some embodiments. As discussed above, an optical tool, such as optical tool 100, may be configured to include one or more components configured to monitor and track a target object. In various embodiments, optical tool 100 includes an optical lens that, as discussed above, may experience bore sight error. Accordingly, a perceived position of the target object may shift and change as a result of the bore sight error, thus resulting in an erroneous tracked position of the target object. In various embodiments, optical tool 100 may be configured to measure and correct the bore sight error associated with the optical lens, thus providing an accurate representation of the position of the target object.

As similarly discussed above, optical tool 100 may include, among other components, collimated light source 104, beam reflector 106, first reflective member 110, optical lens 112, second reflective member 114, imaging sensor 116, position sensitive detector 118, and processing device 120. As shown in FIG. 2, a position of beam reflector 106, first reflective member 110, and/or second reflective member 114 may be configured to reflect the beam of collimated light along a path that travels along an edge of optical lens 112 instead of through its center, as shown by pathway 130. Thus, according to some embodiments, bore sight error measurements and corrections may be performed based on observations taken at the edge of optical lens 112. As discussed above, various factors may contribute to the bore sight error, and position sensitive detector 118 and processing device 120 may be configured to detect and measure corresponding changes in the position of the collimated beam to measure and correct for such bore sight error.

Figure 3:
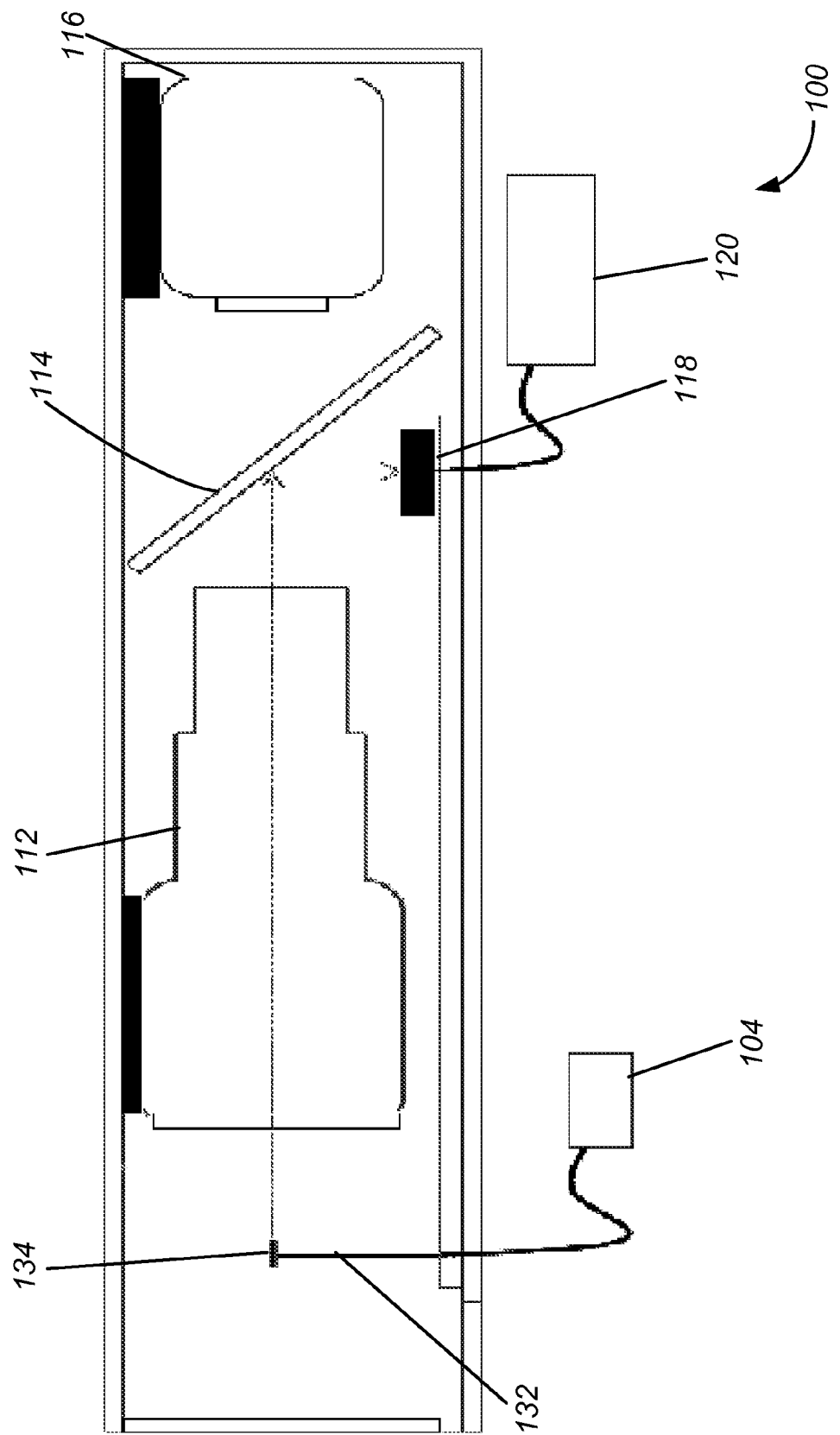
FIG. 3 illustrates a diagram of yet another example of an optical tool, implemented in accordance with some embodiments.

FIG. 3 illustrates a diagram of yet another example of an optical tool, implemented in accordance with some embodiments. As discussed above, an optical tool, such as optical tool 100, may be configured to include one or more components configured to monitor and track a target object, as well as measure and correct bore sight error associated with the one or more components, thus providing an accurate representation of the position of the target object. As similarly discussed above, optical tool 100 may include, among other components, collimated light source 104, optical lens 112, second reflective member 114, imaging sensor 116, position sensitive detector 118, and processing device 120. However, as shown in FIG. 3, optical tool 100 may be configured such that collimated light source 104 provides a beam of collimated light to a fiber optic cable or wave guide, such as wave guide 132, which may be configured to direct the beam to optical output 134. In various embodiments, optical output 134 is configured to project the collimated beam of light into optical lens 112 and to second reflective member 114. In this way, optical tool 100 may be implemented without the use of beam reflector 106 or first reflective member 110 discussed previously with reference to FIG. 1 and FIG. 2.

Figure 4:
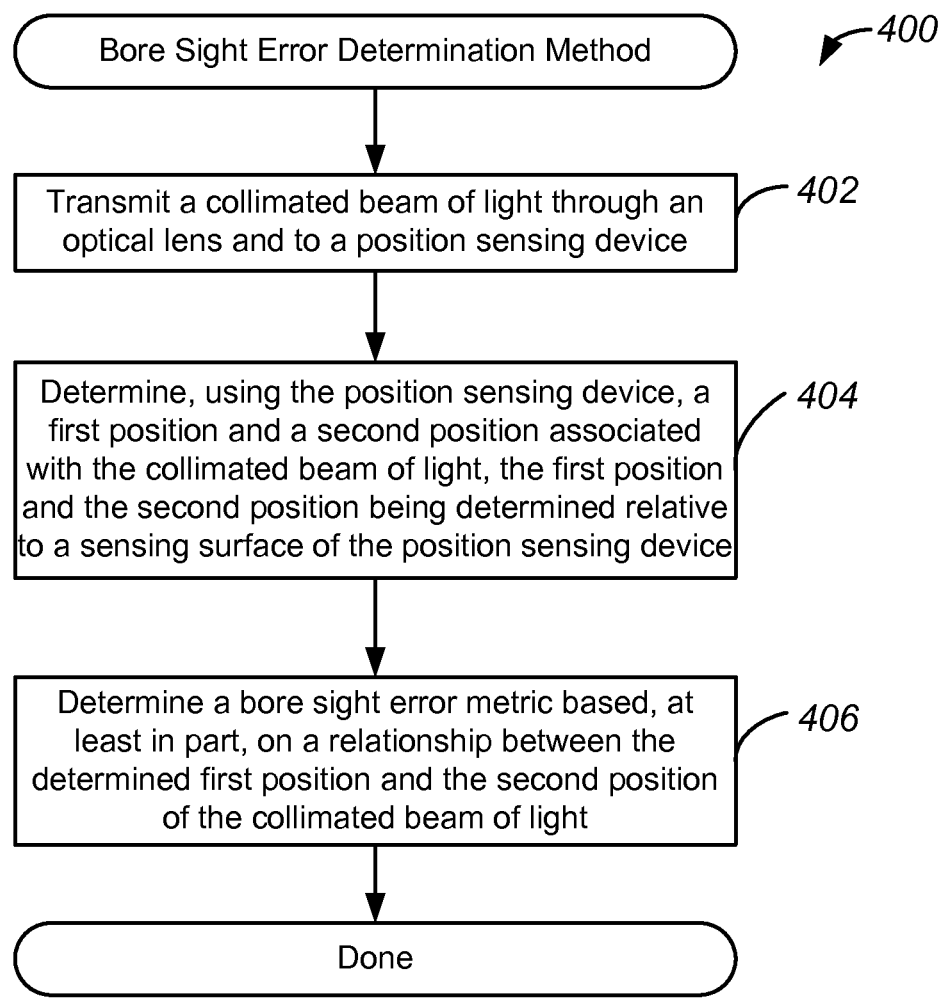
FIG. 4 illustrates a flow chart of an example of a bore sight error determination method, implemented in accordance with some embodiments.

FIG. 4 illustrates a flow chart of an example of a bore sight error determination method, implemented in accordance with some embodiments. A bore sight error determination method, such as method 400, may be implemented to determine and compensate for bore sight error that may be generated by an optical lens when in use. As discussed above, bore sight error may be generated by various different properties and operational variables associated with the optical lens. For example, bore sight error may result from any combination of environmental conditions (temperature and humidity), gravity sag, platform dynamics (such as vibration and shocks), operational degradations, and manufacturing defects, imperfections, and/or irregularities that may be present in the lens. Accordingly, method 400 may be implemented to determine a bore sight error metric that may be used to compensate for the bore sight error associated with the optical lens. In this way, bore sight error resulting from any combination of different variables may be dynamically measured and corrected.

Method 400 may commence with operation 402 during which a collimated beam of light may be transmitted through an optical lens and to a position sensitive detector. As discussed above, the collimated beam of light may be transmitted from a collimated light source, such as a laser. The beam may be transmitted through a central optical axis of the optical lens, or may be transmitted through an edge of the lens along a trajectory that is parallel to the central optical axis. The beam may travel through various lens elements of the optical lens and may emerge from the optical lens after having passed through all of the lens elements.

Method 400 may proceed to operation 404 during which a first position and a second position associated with the collimated beam of light may be determined. In various embodiments, the first position and the second position are determined relative to a sensing surface of the position sensitive detector. Accordingly, after the beam has emerged from the optical lens it may contact a sensing surface of the position sensitive detector. As discussed above, the sensing surface may be configured to measure or determine a spatial position of the beam. Accordingly, at a first moment in time, the position sensitive detector may determine a first position that characterizes or represents the position of the beam on the sensing surface at the first moment in time. Furthermore, at a second moment in time, the position sensitive detector may determine a second position that characterizes or represents the position of the beam on the sensing surface at the second moment in time. In various embodiments, one or more events or changes may have occurred that introduced bore sight error into the optical performance of the optical lens. For example, between the first moment in time and the second moment in time, there may have been one or more changes in a focal length of the optical lens, an internal temperature, as well as an internal humidity. Any combination of these changes may have changed the optical properties of the optical lens and generated bore sight error. Accordingly, the first position may be different than the second position.

Method 400 may proceed to operation 406 during which a bore sight error metric may be determined based, at least in part, on a relationship between the determined first position and the second position of the collimated beam of light. As similarly discussed above, the relationship may be a determined difference value between one or more data values characterizing the first position and one or more data values characterizing the second position. Accordingly, the bore sight error metric may characterize a difference between the first position and the second position. As discussed above and in greater detail below, the bore sight error metric may be utilized to update and correct positions perceived by the optical lens as well as compensate for and remove the bore sight error from images generated using the optical lens.

Figure 5:
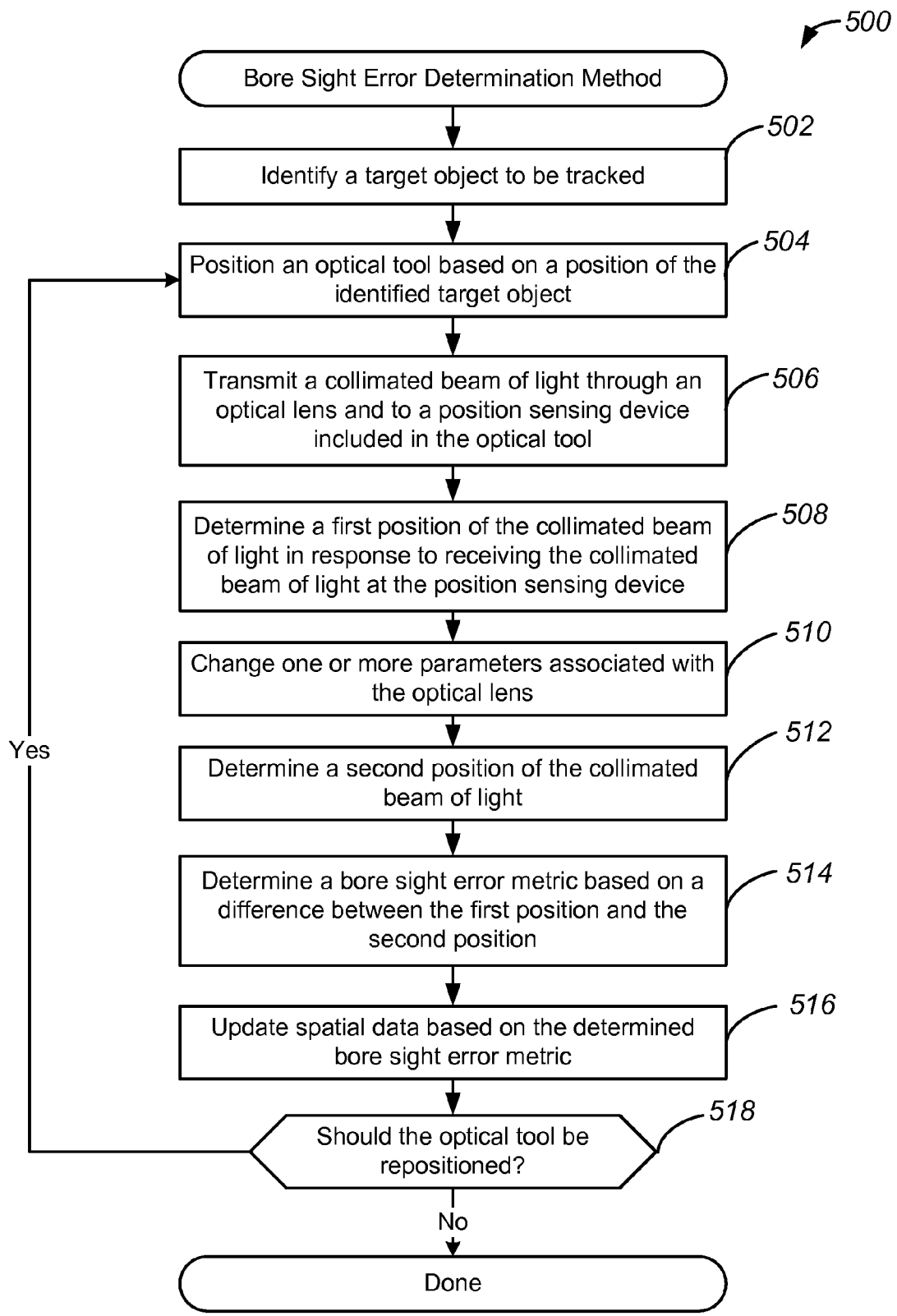
FIG. 5 illustrates a flow chart of another example of a bore sight error determination method, implemented in accordance with some embodiments.

FIG. 5 illustrates a flow chart of another example of a bore sight error determination method, implemented in accordance with some embodiments. As similarly discussed above, a bore sight error determination method, such as method 500, may be implemented to determine and compensate for bore sight error that may be generated by an optical lens when in use. Accordingly, method 500 may be implemented to determine a bore sight error metric that may be used to compensate for the bore sight error associated with the optical lens. As discussed in greater detail below, such bore sight error determination and compensation may be implemented in real time as part of a tracking system used to track a target object, thus providing real time error compensation for a tracking system.

Method 500 may commence with operation 502 during which a target object may be identified. In various embodiments, an optical tool associated with method 500 may be implemented as part of a tracking system which may provide tracking, guidance, and telemetry data for other systems, such as a weapons system. Accordingly, during operation 502 a target object may be identified as a target object that is to be tracked by the optical tool. In some embodiments, the target object may be identified based on an input provided by a user. The input may identify an initial set of coordinates at which the target object is located. In various embodiments, the target object, as well as an initial location of the target object, may be identified based on image-recognition software associated with the optical tool.

Method 500 may proceed to operation 504 during which an optical tool may be positioned based on a position of the identified target object. In various embodiments, the optical tool may be mounted on a movable platform having one or more rotational axes that enable the optical tool to track a target object in three-dimensional space. The movable platform may control movement of the optical tool via robotically controlled movable motors that can rotate the optical tool as well as increase or decrease an inclination of the optical tool. In various embodiments, movement of the movable platform may be controlled by a processing device such as processing device 120 described above, or by and external computer system. During operation 504, the optical tool may be moved and positioned such that an optical lens included in the optical tool is pointed or targeted at the target object.

Method 500 may proceed to operation 506 during which a collimated beam of light may be transmitted through an optical lens and to a position sensitive detector included in the optical tool. As similarly discussed above with reference to FIG. 4, the collimated beam of light may be transmitted from a collimated light source, such as a laser. The beam may be transmitted through a central optical axis of the optical lens, or may be transmitted through an edge of the lens along a trajectory that is parallel to the central optical axis. The beam may travel through various lens elements of the optical lens and may emerge from the optical lens after having passed through all of the lens elements. As discussed above, the beam may be reflected off of a first reflective member and a second reflective member that ensure that the beam is accurately guided through the optical lens and to the position sensitive detector.

Method 500 may proceed to operation 508 during which a first position of the collimated beam of light may be determined in response to receiving the collimated beam of light at the position sensitive detector. As similarly discussed above, the first position may be determined relative to a sensing surface of the position sensitive detector. Accordingly, after the beam has emerged from the optical lens it may contact a sensing surface of the position sensitive detector and the sensing surface may be measure or determine a spatial position of the beam. Thus, at a first moment in time, the position sensitive detector may determine a first position that characterizes or represents the position of the beam on the sensing surface at the first moment in time. In various embodiments, the first position may be determined in response to photosensitive elements of the sensing surface detecting the collimated beam of light. In some embodiments, the first position may be determined in response to the passing of a period of time. For example, the position sensitive detector may be configured to periodically measure positions measured by its associated sensing surface.

Method 500 may proceed to operation 510 during which one or more parameters associated with the optical lens may change. As discussed above, one or more events or changes may have occurred that introduced bore sight error into the optical performance of the optical lens. For example, after the first moment in time, there may have been one or more changes to parameters associated with the optical lens, such as a focal length of the optical lens, an internal temperature, as well as an internal humidity. Any combination of these changes may have changed the optical properties of the optical lens and generated bore sight error. Accordingly, during operation 510 various properties of the optical lens may change. In one example, the optical lens may be a zoom lens. In this example, during operation 510, the optical lens may be changed from a first focal length to a second focal length. As discussed above, the optical lens may have a bore sight error that resulted from imperfections in the manufacturing of the optical lens, and have manifested due to the change in focal lengths.

Method 500 may proceed to operation 512 during which a second position of the collimated beam of light may be determined. Accordingly, at a second moment in time, the position sensitive detector may determine a second position that characterizes or represents the position of the beam on the sensing surface at the second moment in time. Because of the changes that occurred during operation 510 and their associated bore sight error, a position of the beam has changed, and the first position is different than the second position.

Method 500 may proceed to operation 514 during which a bore sight error metric may be determined based on a difference between the first position and the second position. As similarly discussed above, the first and second positions may be represented as X-Y coordinates on an X-Y plane that is mapped to or represents the sensing surface of the position sensitive detector. Accordingly, a component of the optical tool, such as a processing device, may be configured to calculate or determine a difference value characterizing a difference between the two X-Y coordinate pairs. In some embodiments, the difference value may represent the difference as a linear distance or may represent the difference as an X adjustment and a Y adjustment. The processing device may store the determined bore sight error metric in a memory for subsequent use.

Method 500 may proceed to operation 516 during which spatial data may be updated based on the determined bore sight error metric. As discussed above, the optical tool may be configured to store an identified position of the tracked object as a position encoded in TSPI data. As previously discussed, such an identified position may be determined based on measured three dimensional locations associated with an optical tool as well as range-to-target data that may be provided by a ranging system. In this way, the position of the target object may be identified and recorded as a representation in three-dimensional space. In various embodiments, the bore sight error metric may be applied to the TSPI data. For example, if TSPI data is collected after the second moment in time, the bore sight error metric may be used to modify the TSPI data and correct for bore sight error that was generated between the first moment and second moment. If the bore sight error metric characterizes an X adjustment and a Y adjustment, such adjustments may be applied to X and Y axes of the underlying data associated with the TSPI data. In this way, the TSPI data may be adjusted and bore sight error otherwise affecting the TSPI data may be eliminated.

Method 500 may proceed to operation 518 during which it may be determined whether the optical tool should be repositioned. In various embodiments, such a determination may be made based on a position of the target object. For example, if the target object has moved it may exit the field of view the optical tool. Accordingly, in response to detecting that the target object has moved, the optical tool may be configured to reposition itself such that the target object is centered in the optical tool's field of view. If it is determined that the optical tool should be repositioned, method 500 may return to operation 504. If it is determined that the optical tool should not be repositioned, method 500 may terminate.

Figure 6:
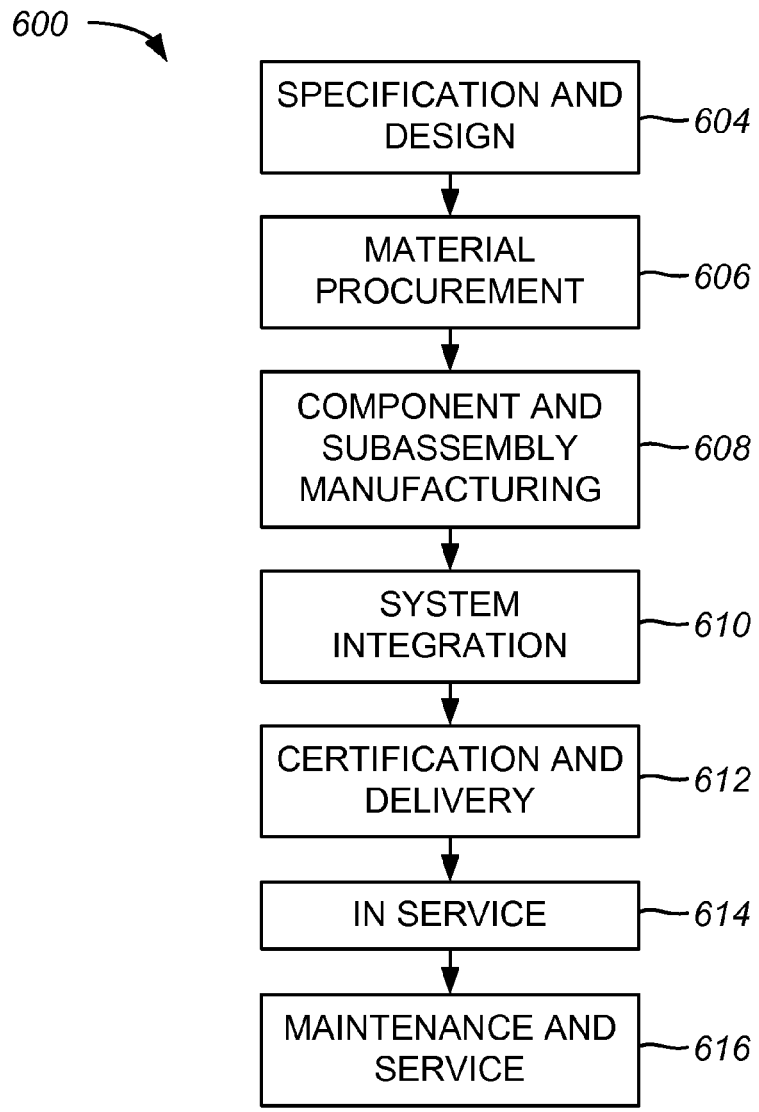
FIG. 6 illustrates a flow chart of an example of an aircraft production and service methodology, implemented in accordance with some embodiments.
Figure 7:
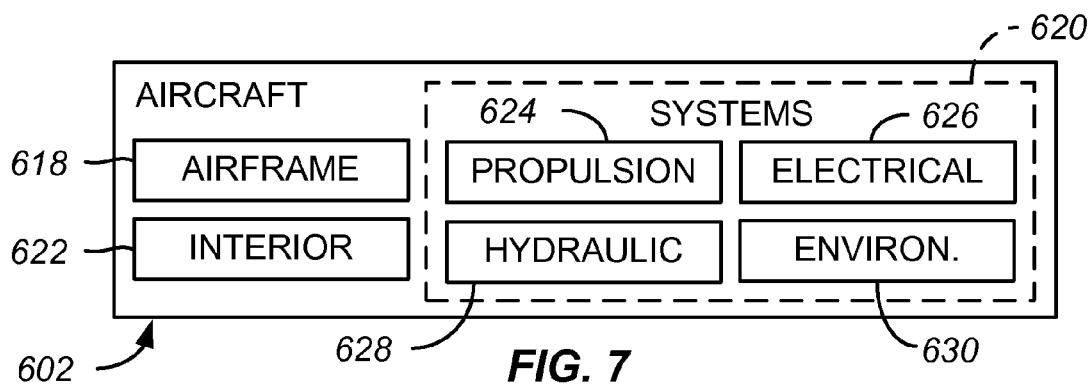
FIG. 7 illustrates a block diagram of an example of an aircraft, implemented in accordance with some embodiments.

Embodiments of the disclosure may be implemented in combination with an aircraft manufacturing and service method 600 as shown in FIG. 6 and an aircraft 602 as shown in FIG. 7. During pre-production, illustrative service method 600 may include specification and design 604 of the aircraft 602 and material procurement 606. During production, component and subassembly manufacturing 608 and system integration 610 of the aircraft 602 takes place. Thereafter, the aircraft 602 may go through certification and delivery 612 in order to be placed in service 614. While in service by a customer, the aircraft 602 is scheduled for routine maintenance and service 616 (which may also include modification, reconfiguration, refurbishment, and so on).

Each of the processes of service method 600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 7, the aircraft 602 produced by illustrative method 600 may include an airframe 618 with a plurality of systems 620 and an interior 622. Examples of high-level systems 620 include one or more of a propulsion system 624, an electrical system 626, a hydraulic system 628, and an environmental system 630. Any number of other systems may be included. Although an aerospace example is shown, the principles of the invention may be applied to other industries, such as the automotive industry.

Apparatus and methods embodied herein may be employed during any one or more of the stages of the production and service method 600. For example, components or subassemblies corresponding to production operation 608 may be fabricated or manufactured in a manner similar to components or subassemblies produced while the aircraft 602 is in service. Also, one or more apparatus embodiments, method embodiments, or a combination thereof may be utilized during the production operations 608 and 610, for example, by substantially expediting assembly of or reducing the cost of an aircraft 602. Similarly, one or more of apparatus embodiments, method embodiments, or a combination thereof may be utilized while the aircraft 602 is in service, for example and without limitation, to maintenance and service 616.

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered as illustrative and not restrictive.

What is claimed is:

1. An apparatus for determining bore sight error, the apparatus comprising:
   an optical lens configured to focus an image at a focal plane using one of a plurality of focal lengths;

a collimated light source configured to emit a beam of collimated light having a first wavelength, the beam of collimated light passing through the optical lens and parallel to an optical axis of the optical lens;

a position sensitive detector configured to receive the beam emitted by the collimated light source, the position sensitive detector being further configured to identify a first position of the beam relative to the position sensitive detector; and a processing device communicatively coupled to the position sensitive detector, the processing device being configured to generate a bore sight error metric based, at least in part, on the first position identified by the position sensitive detector, the bore sight error metric characterizing a difference between an actual position of a target object and a perceived position viewed by the optical lens.

2. The apparatus of claim 1 further comprising:

a first reflective member configured to receive the beam from the collimated light source, the first reflective member being further configured to reflect the beam through the optical lens; and a second reflective member configured to receive the beam of light from the first reflective member after the beam has passed through the optical lens, the second reflective member being further configured to reflect the beam to the position sensitive detector.

3. The apparatus of claim 2, wherein the first reflective member and the second reflective member are configured to be transmissive in a first range of wavelengths, wherein the first reflective member and the second reflective member are further configured to be reflective in a second range of wavelengths, and wherein the first wavelength of the beam is included in the second range of wavelengths.

4. The apparatus of claim 3 further comprising an imaging sensor configured to detect at least a portion of the first range of wavelengths.

5. The apparatus of claim 4, wherein the position sensitive detector is a same optical distance from the optical lens as the imaging sensor, and wherein the beam of collimated light is passed through a center of the optical lens.

6. The apparatus of claim 1, wherein the position sensitive detector is further configured to determine a second position, wherein the second position is different than the first position, and wherein a difference between the first position and the second position results from a bore sight error associated with the optical lens.

7. The apparatus of claim 6, wherein the bore sight error metric is calculated based on the difference between the first position and the second position.

8. The apparatus of claim 6, wherein the bore sight error results from a change in the optical lens from a first focal length to a second focal length.

9. The apparatus of claim 1, wherein the processing device is further configured to update time-space-position-information (TSPI) data associated with a target object based on the bore sight error metric.

10. The apparatus of claim 1, wherein the processing device is configured to update the TSPI data by adjusting spatial data underlying the TSPI data based on a difference characterized by the bore sight error metric.

11. A system for determining bore sight error, the system comprising:

an optical lens configured to focus an image at a focal plane using any one of a plurality of focal lengths;

an imaging sensor configured to generate an image based on light received from the optical lens;

a collimated light source configured to emit a beam of collimated light having a first wavelength, the beam of collimated light passing through the optical lens and parallel to an optical axis of the optical lens;

a position sensitive detector configured to receive the beam and identify a first position of the beam relative to the position sensitive detector;

a first reflective member configured to receive the beam from the collimated light source and reflect the beam through the optical lens;

a second reflective member configured to receive the beam of light from the first reflective member and reflect the beam to the position sensitive detector; and a processing device communicatively coupled to the position sensitive detector, the processing device being configured to generate a bore sight error metric based, at least in part, on the first position identified by the position sensitive detector, the bore sight error metric characterizing a difference between an actual position of a target object and a perceived position viewed by the optical lens.

12. The system of claim 11, wherein the position sensitive detector is further configured to determine a second position, wherein the second position is different than the first position, and wherein a difference between the first position and the second position results from a bore sight error associated with the optical lens.

13. The system of claim 12, wherein the first position and second position are each mapped to an XY coordinate representation of the position sensitive detector.

14. The system of claim 13, wherein the bore sight error metric is calculated based on the difference between a first XY coordinate pair characterizing the first position and a second XY coordinate pair characterizing the second position.

15. The system of claim 14, wherein the processing device is further configured to update time-space-position-information (TSPI) data associated with a target object based on the bore sight error metric.

16. The system of claim 15, wherein the processing device is configured to update the TSPI data by adjusting spatial data underlying the TSPI data based on a difference characterized by the bore sight error metric.

17. A method for determining bore sight error, the method comprising:

transmitting, from a collimated light source, a collimated beam of light through an optical lens and to a position sensitive detector;

determining, using the position sensitive detector, a first position and a second position associated with the collimated beam of light, the first position and the second position being determined relative to a sensing surface of the position sensitive detector; and determining a bore sight error metric based, at least in part, on a relationship between the determined first position and the second position of the collimated beam of light.

18. The method of claim 17, wherein the transmitting further comprises:

reflecting, using a first reflective member, the beam from the collimated light source to the optical lens; and reflecting, using a second reflective member, the beam of light from the first reflective member to the position sensitive detector after the beam has passed through the optical lens.

19. The method of claim 18 further comprising:
updating time-space-position-information (TSPI) data associated with a target object based on the bore sight error metric.

20. The method of claim 19, wherein the updating of the TSPI data further comprises:
adjusting spatial data underlying the TSPI data based on a difference characterized by the bore sight error metric.

\* \* \* \* \*